Aug. 8, 1961 R. LESSIG ET AL 2,995,365

READ-OUT APPARATUS FOR LINE SELECTION MECHANISM

Filed Feb. 1, 1960 5 Sheets-Sheet 1

INVENTORS.
ROLAND LESSIG
WILMER S. POWELL

BY William R. Nolte

AGENT

Aug. 8, 1961 R. LESSIG ET AL 2,995,365

READ-OUT APPARATUS FOR LINE SELECTION MECHANISM

Filed Feb. 1, 1960 5 Sheets-Sheet 2

INVENTORS.
ROLAND LESSIG
WILMER S. POWELL
BY
William R. Nolte
AGENT

INVENTORS.
ROLAND LESSIG
WILMER S. POWELL
BY William R. Nolte
AGENT

READ-OUT APPARATUS FOR LINE SELECTION MECHANISM

Filed Feb. 1, 1960 5 Sheets-Sheet 4

INVENTORS.
ROLAND LESSIG
WILMER S. POWELL
BY
William R. Nolte
AGENT

READ-OUT APPARATUS FOR LINE SELECTION MECHANISM

Filed Feb. 1, 1960 5 Sheets-Sheet 5

INVENTORS.
ROLAND LESSIG
WILMER S. POWELL
BY
William R. Nolte
AGENT

United States Patent Office 2,995,365

Patented Aug. 8, 1961

2,995,365

READ-OUT APPARATUS FOR LINE SELECTION MECHANISM

Roland Lessig and Wilmer S. Powell, Philadelphia, Pa., assignors to Burroughs Corporation, Detroit, Mich., a corporation of Michigan Filed Feb. 1, 1960, Ser. No. 5,733

11 Claims. (Cl. 271—53)

This invention relates broadly to read-out apparatus for line selection mechanism, and more particularly to photo-optical read-out apparatus for line selection mechanism associated with document handling devices. The subject matter of this invention is shown and described in connection with the line selection mechanism set forth in the co-pending application for patents of Bradshaw et al., entitled "Record Sheet Feeding and Line Selection Mechanism," Serial No. 838,468, filed September 8, 1959, and assigned to the same assignee as the present application.

This invention has applicability to accounting machine employing account balance reading and recording devices in which provision is made for sequentially feeding ledger sheets or documents past a printing station and stopping certain of the sheets in posting positions for receiving printed data thereon. Upon completion of a posting cycle each sheet is fed past recording devices which apply coded data thereto which is indicative of the location of the last printed line on the document. For correctly positioning the sheets for such posting operations, line-indexing or selection apparatus is provided which stops the motion of the ledger sheets opposite the printing station so that posting takes place on the place on the first blank line beneath the previous printed lines on the ledgers. Photo-optical devices, associated with such line-indexing apparatus, monitor the movement of the ledger sheets by the apparatus and emit signals which may be utilized to encode the documents with data relative to entry of the last printed line of data thereon.

Accordingly, the principal object of the present invention is the provision of means for indicating the posting position of the record sheet as its movement is controlled and stopped by a line-selection device.

Another object of the invention is the provision of a read-out device for automatically indicating the mechanical positions of a record sheet while it is being brought up to printing position and while it is being ejected.

Another object of the invention is the provision of photocell devices for sensing and monitoring the mechanical positions of belt stopping means which limit the travel of a document relative to a printing position of a printing device.

A further object of the invention is the provision of photocell means and rotatable drum means having binary decimal code perforations therein for indicating the mechanical positions of stop means which limit the travel of a ledger sheet.

Further objects of the invention will be pointed out in the following description and claims and illustrated in the accompanying drawings, which disclose, by way of example, the principle of the invention and the best mode which has been contemplated for applying that principle.

The line selection mechanism of the previously mentioned Bradshaw et al. application to which the features of the present invention are applied, illustrates and explains in extensive detail the operational environment of the present invention. In the present application reference will be made to the former application and will be described in only as much detail as will be necessary to explain the manner in which the objects of the invention may be realized. Elements which are disclosed in the prior application and referred to hereinafter are designated by the same reference number as in said Bradshaw application.

Figure 1:
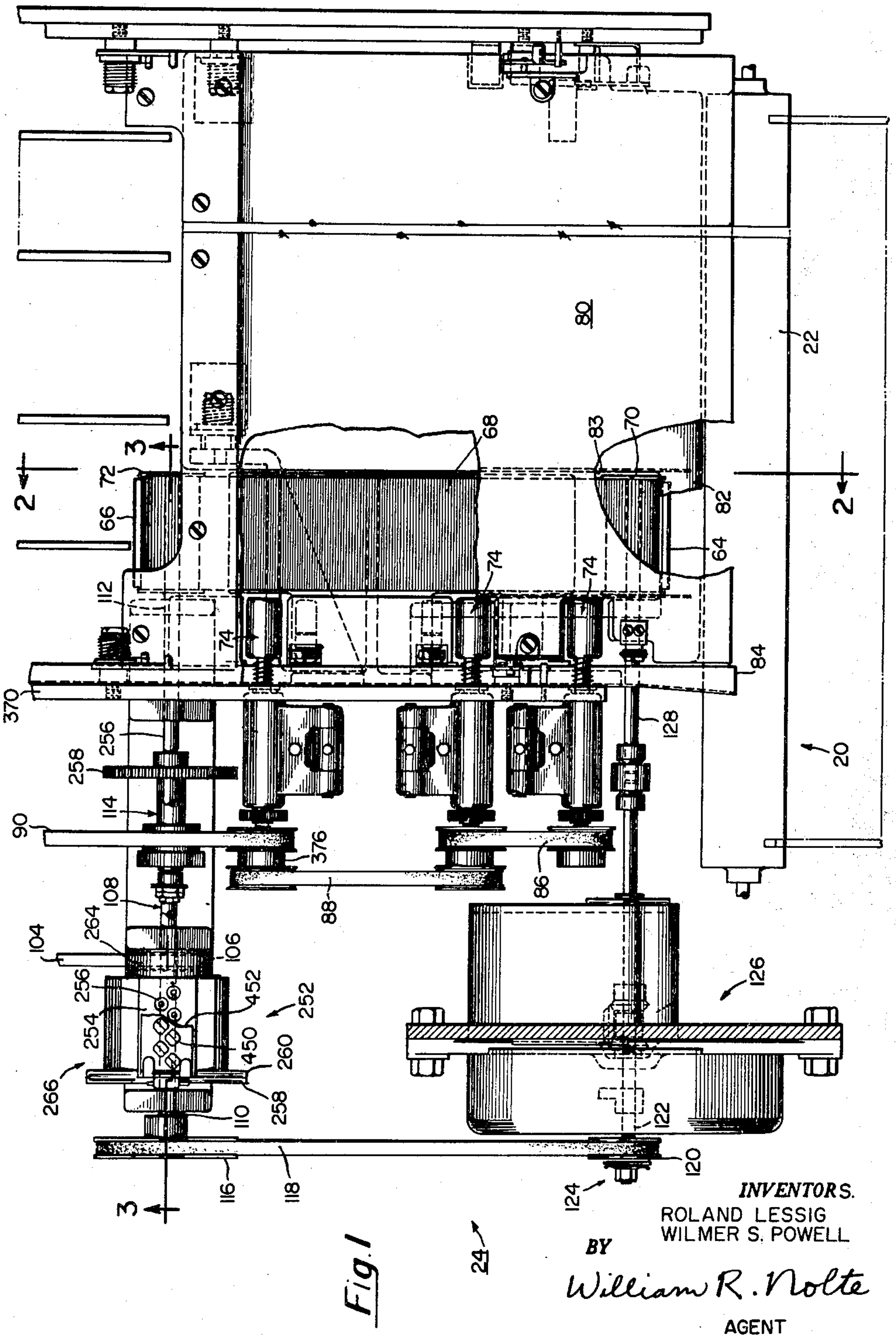
FIG. 1 is a front elevational view of a sheet feeding and line selecting mechanism incorporating a preferred structural embodiment of an optical read-out device constructed in accordance with the invention.
Figure 2:
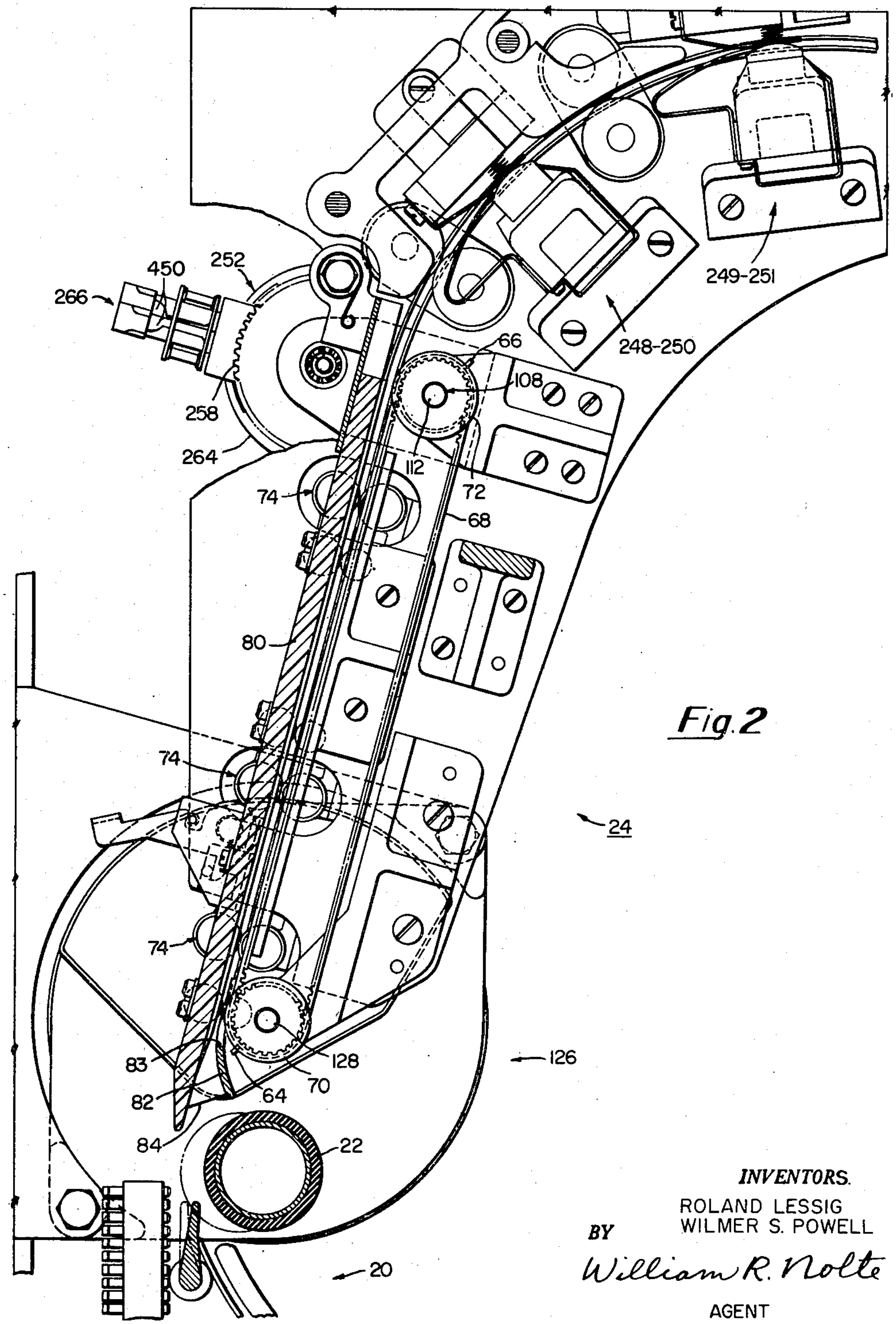
FIG. 2 is a slightly enlarged vertical sectional view taken along the line 2—2 of FIG. 1.
Figure 3:
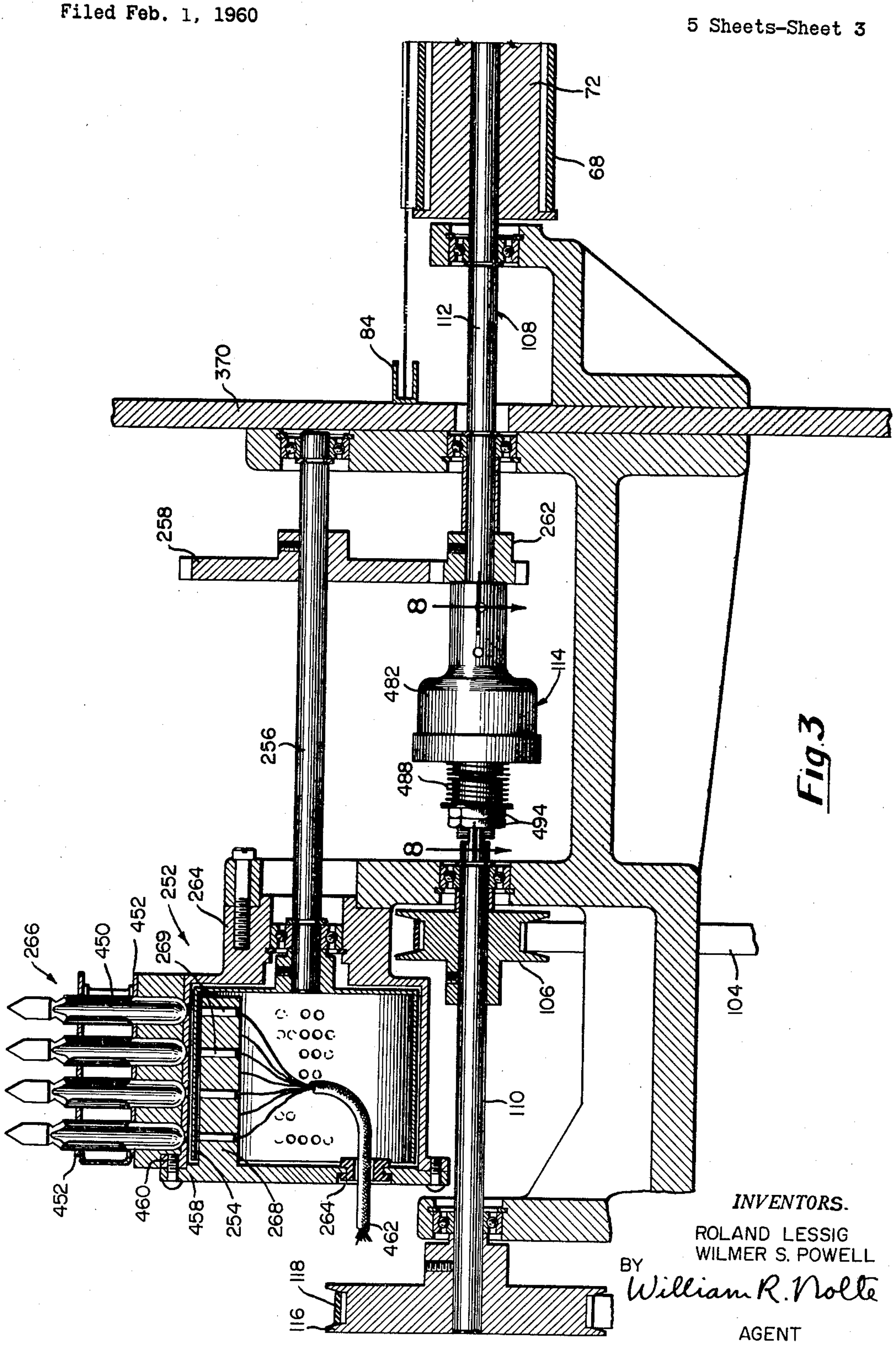
FIG. 3 is an enlarged horizontal sectional view taken along the line 3—3 of FIG. 1 and illustrating the optical read-out device for indicating the line printing positions of the line selecting mechanism.

The preferred form of photo-optical read-out apparatus designated by reference character 252 in FIGS. 1, 2, 3 is shown associated with line selecting mechanism 24 for the purpose of indicating the position at which a ledger sheet is stopped to receive a printing operation thereon. The read-out apparatus as shown is used for converting information from one form to another and more particularly for converting mechanical positional information relating to the line selecting mechanism to binary information in the form of electrical signals. Referring to FIGS. 1, 3 the read-out device 252 includes a hollow drum 254 having perforations therein using one of the binary codes. The drum is closed at one end and is mounted integral with shaft 256, the drum being adapted to rotate within a housing 264. The shaft 256 is suitably geared to rotate with a line selecting belt 68 which is operative to arrest the movement of a ledger sheet in a manner as will be hereinafter described. A light source 266 comprising a plurality of light bulbs 450 are mounted upon housing 264 and aligned with the perforations in the drum. A corresponding plurality of photocells 269 disposed within the drum are similarly aligned and are mounted upon block 268 which is integral with end plate 458. Rotation of line selecting belt 68 and code drum 254 occur simultaneously such that the light from the lamp assembly scans the perforations presented and energizes the photocells mounted within the drum.

With more particular reference to FIGS. 1 and 2, there are shown the front and side views of a bank ledger processing apparatus incorporating a line selecting mechanism and read-out apparatus therefor of the present invention. Sheet items or ledgers are moved upwardly in the transport mechanism in a generally upward direction so as to come between a row of type carriers 60 containing character printing type slugs 62 and the platen 22 of a printing mechanism 20, as best seen in FIG. 2. The roller pairs 74 are arranged to engage one side margin of the members, leaving the central portion and right margin free of gripping elements. The rollers moreover are adapted to maintain the marginal edges of the sheet items or ledgers which they grip in alignment with the base of a side edge aligning channel shaped member 84. The sheet items are advanced along a slightly inclined vertical path above the printing platen 22, see also FIG. 5, and may be registered with respect to the printing platen by means of spaced-apart tabs or abutments 64 and 66 which are mounted for movement in an orbital path. The path of the abutments coincides with the path of movement of the record sheet for a portion of its length. For accomplishing the orbital movement, the tabs are shown as fixed in projecting relation to the outer surface of an endless web or belt 68 which is mounted for movement upon pulleys 70 and 72, the two tabs being equally spaced about the periphery of the belt. At least one of the pulleys serves to provide constant driving torque for moving the belt, and for the purpose of providing close accurate movement of the belt it is preferred to include internal transverse ribs on the belt and mesh such ribs with flutes or ribs on the pulleys as shown in FIG. 2. The endless belt 68 is positioned adjacent to the path of movement of the record sheets in the line-selecting mechanism and such that one portion thereof travels in close parallel relation to the transport path so as to separately project the tabs thereinto.

Figures 5, 6, 7:
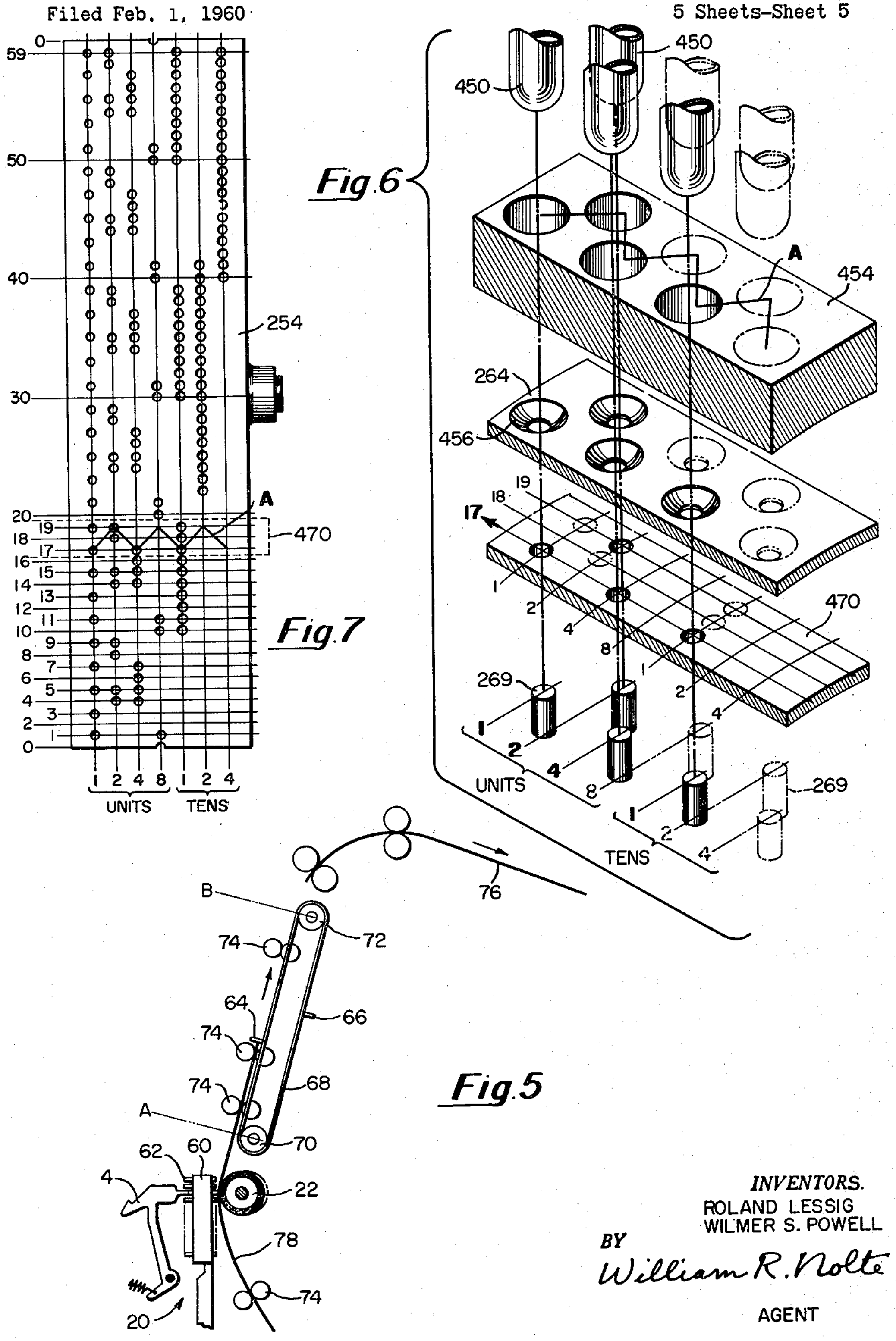
FIG. 5 is a diagrammatic view illustrating the arresting of a ledger sheet by the line selecting mechanism.
FIG. 6 is an exploded diagrammatical view of portions of the optical code read-out device and illustrates certain of the light transmitting patterns thereof.
FIG. 7 is a developed view in plan of the rotatable coded drum of the read-out device.

As will be described more fully hereinafter, the endless belt 68 is capable of being moved to advance one or the other of the tabs into and along the sheet transport path and to stop the tab at a predetermined position representing a particular printing line on the sheet which it blocks in the path. A plural number of such tab stopping positions are provided. As shown in FIG. 5, fifty such positions representing fifty different printing lines on each sheet are provided between the lines A and B indicated thereon. The tabs or abutments on the endless belt when the latter is in its "home" or free flow position, as shown in FIG. 2, are free from the path of movement of the record sheets enabling the sheets to be advanced uninterruptedly through the line selecting mechanism by several pairs of opposing driving rollers 74—74 acting on one of the margins of the sheets as previously mentioned. When it is desired to stop a particular record sheet such as ledger 78, FIG. 5, in accordance with sheet positioning information furnished to the mechanism, a torque is applied through belt pulley 72 to advance the belt 68 so that one of the abutments such as tab 64 is interposed between the trailing edge of a preceeding record sheet 76 passing through the device and the leading edge of the selected sheet 78. As shown in FIG. 5, the endless belt 68 has carried the tab 64 into and along the path of the ledger sheets and has stopped it at a selected position which in the example shown corresponds to the 20th line position where it is effective to thereby obstruct the further passage of the sheet along its path as indicated by the abutment of sheet 78 thereagainst.

When so stopped, the individual record sheet 78 is positioned so that the selected printing line, usually the first vacant one, lies opposite the platen 22 which is then moved theretoward from its open dotted line position to its closed full line position in FIG. 5. At the same time the optical read-out device of the present invention operates to provide a static indication of which position the abutment 64 was stopped. Upon completion of this platen movement, one or more type carriers are raised to predispose a selected typing slug in printing position and associated hammers H of the printer strike appropriate slugs in the type carriers to record new visual data on the stopped record sheet. After completion of the printing operations, which may involve single line indexing of the stopped sheet 78 to immediately successive posting lines, the torque which is always present moves the belt 68 when it is released by its associated control devices in the direction of feed of the ledgers. The abutments 64 and 66 thus move to their alternate "home" positions while at the same time the rollers 74—74 accelerate the stopped sheet to transport velocity and eject the sheet from the printer and line selecting mechanism.

Referring now to FIG. 1, it is noted that the sheet positioning belt 68 is arranged to operate alongside of the several pair of sheet advancing rollers 74—74 and in association with a pair of opposed closely spaced parallel plates 80 and 82. The two plates 80 and 82, FIG. 2, are shown as rising slightly inclined from the vertical above the platen 22 of the printer 20 and the space between the two plates is left unobstructed, except for the action of the stopping tabs 64 and 66, to form a guideway through the line selecting mechanism constituting a continuation of the sheet transport path through the printer. When it is desired to have the printing on the sheets or ledgers exposed to view, plate 80 may be composed of transparent material. The belt 68 is mounted so that one section thereof passes close to the space between the plates so as to carry the sheet stopping tabs thereinto and along the guideway provided by the plates. For this purpose the belt may be located behind the back plate 82 and the latter provided with an elongated slot 83. Only that part of the belt is used which is tangent to and parallel to the ledger path.

The torque for driving the aforementioned opposed pairs of transport rollers 74 and the pulleys 70 and 72 of endless belt 68 is derived from a source of motive power such as a motor not shown which operates to drive belt 104 shown generally in the upper left portion of FIG. 1. A series of belts 86, 88 and 90 suitably interconnected with one another and the source of input power through belt 104 drive the transport rollers associated with the lines selection mechanism. As seen in FIGS. 1 and 3, power input belt 104 through pulley 106 drives shaft 108 to drive the upper pulley of the sheet positioning belt 68, also see FIG. 2. Shaft 108 is divided into two portions identified as 110 and 112 which are connected through a friction clutch 114. The clutch will permit shaft portion 110 to continue to rotate relative to shaft portion 112 when the line selecting belt 68 is arrested from movement. The left hand shaft portion 110 by means of pulley 116 affixed thereto and belt 118, as shown in FIG. 1, operates through pulley 120 to rotatingly drive a lower shaft 122. Control means responsive to external signals is provided for moving and stopping the sheet positioning belt 68 and thereby locating one of the tabs 64 and 66 at any one of the printing line positions referred to hereinabove. Such control means which is generally indicated at 126 operates to permutably control the rotation of the two lower aligned shafts 122 and 128, the latter affixed to lower pulley 70.

After the ledger sheet has undergone posting operations, the sheet will be ejected in the manner as previously described and will during the course of such ejection have the magnetic data on these stripes updated to correspond to the new visual data which has been recorded on the front face thereof. For this purpose, and as seen in FIG. 2, magnetic write heads 248 and 250 are provided to update the coded data which may appear on the lower surface of the sheets and a second pair of sensing heads 249, 251, may be provided for checking purposes.

Figures 4, 8:
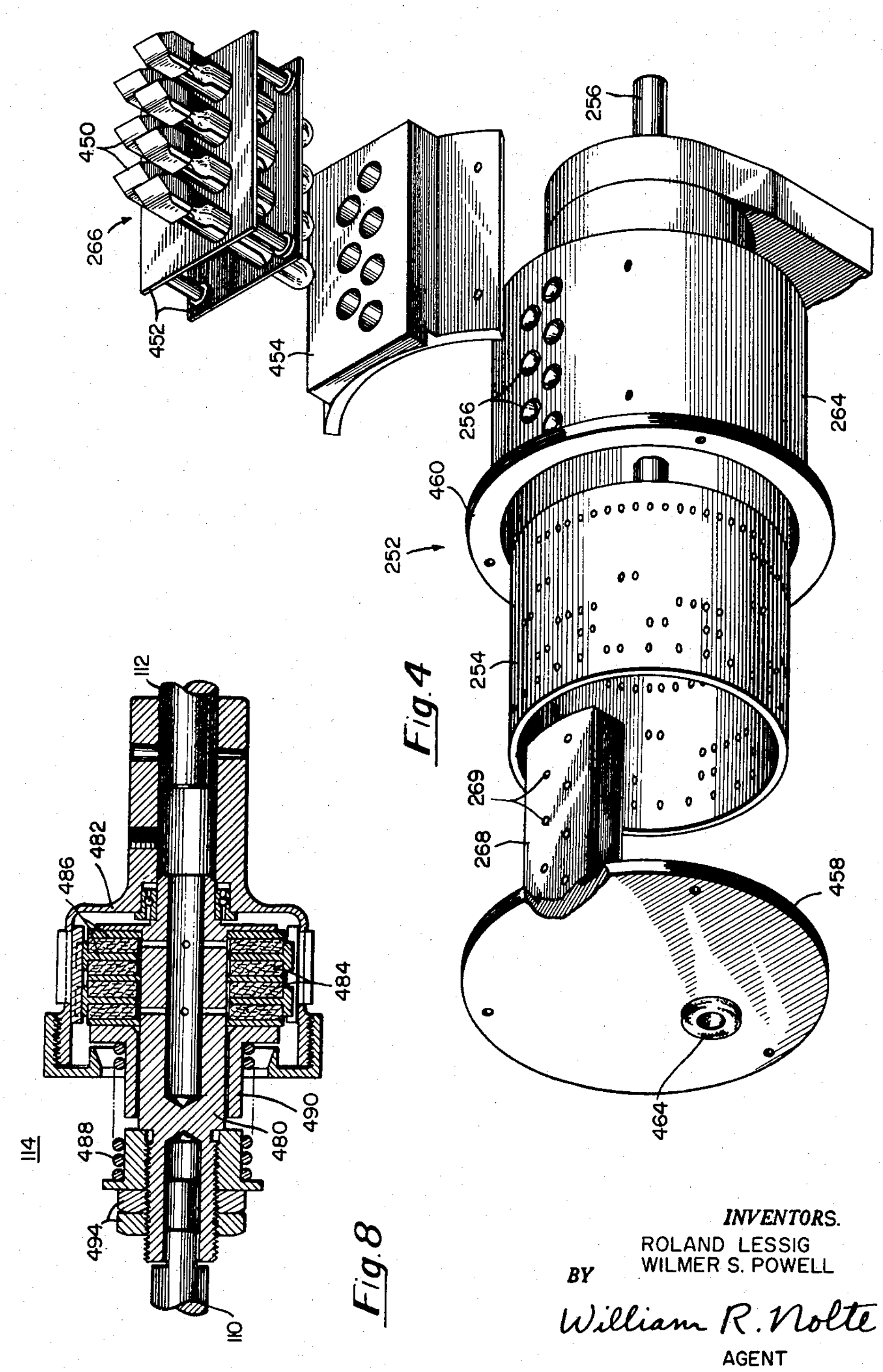
FIG. 4 is an exploded perspective view of the optical code read-out device associated with the line selecting mechanism shown in FIG. 1.
FIG. 8 is an enlarged sectional view taken along the line 8—8 of FIG. 3 and illustrating the clutch through which torque is applied for driving the line selecting mechanism and the optical read-out device.

Although various types of clutches may be used through which to drive the endless belt 68 and yet permit stoppage thereof without interruption of the driving torque applied thereto, a desirable construction for the clutch 114 is shown in FIG. 8. As shown therein, the half-shafts 110 and 112 are shown in alignment and connected by the clutch device. An inner member 480 of the clutch device is fixed to the adjacent end of the driving shaft 110 and enters a bell shaped member 482 which is fixed to the adjacent end of the driven shaft 112. In the annular space between the inner member 480 and the bell shaped member 482 there are provided two series of alternately interleaved clutch elements, one series of which indicated at 484 are composed of friction material and the other series of which indicated at 486 are composed of metallic material. The friction elements 484 are free, i.e., they are unconnected to either the driving or driven member of the clutch. However, the series of metallic clutch elements 486 are alternately axially slidably keyed to the driving and driven members of the clutch. The clutch elements are yieldingly compressed together by a coiled spring 488 acting on a collar 490 axially movable on inner member 480 and shaped to bear against one end of the clutch elements as shown in FIG. 8. The opposite end of the coiled spring is seated upon an adjustable collar 492 which is threaded upon the inner clutch member 480 and locked in adjustment by lock nuts 492. The clutch device 140 is designed to receive suitable lubrication as is customary for this type of clutch.

As previously described, FIG. 3, the rotatable drum 254 having code perforations therein is attached at its closed end to shaft 256. Gear 258 affixed to the drive shaft of the drum receives power from gear 262 affixed to shaft 112 which drives the upper pulley 72 of the line find belt 68. The light source 266, FIG. 4, may be composed of a plurality of separate lamps 450 arranged in two rows on a sub-assembly 452 which is mounted on an apertured sub-frame 454 which in turn is mounted on the stationary housing 264 enclosing the rotatable drum 254. The housing is provided with apertures 456 therethrough aligning the lamps and the apertures in the sub-frame 454. When any one of the coded holes of the drum are in registration with a hole 456 in the housing the light passing through such holes in the drum will be received by one of the light sensitive elements 269 in the fixture 268 which projects into the drum through the opened end thereof. The fixture 268 is in the form of an oblong block curved to the curvature of the drum and is fixed or integrally connected to a circular plate 458. This plate in turn is secured to the flange 460 on the housing 264 and forms a light tight seal for the open end of the drum. The light sensitive elements 269 may be photo-diodes or photocells as previously mentioned, and each is provided with an electrical lead extending from the base thereof as indicated in FIG. 3, all of which may be assembled into a cable 462 which passes out through an electrical insulating grommet secured in a hole 464. The closed end of the perforated drum 254 is fixed to the end of the shaft 256 which is journalled for rotation at its opposite ends in the manner shown.

The coding used to convert the mechanical position of the sheet stopping tabs 64 and 66 to electrical signals may be of any suitable kind. In the illustrated embodiment of the invention the coded perforations on the drum 254 convert positions of the endless belt 68 and its tabs from decimal notation to binary notation so that the electrical signals provided by the leads in the output cable 462 are binary in form for subsequent utilization. A desirable coded arrangement of the perforations in the drum periphery is that shown in the development view in FIG. 7 where the entire periphery of the drum is laid out in one plane.

The lamps 450 as well as the photo-diodes 269 are staggered to form two rows rather than one longer row to facilitate a more economical and compactly arranged device. More particularly, as shown in FIG. 6, three of the seven lamps 252 are disposed in a rear row while the four remaining lamps are disposed in a front row. The lamps in each of the rows are moreover offset with respect to each other so as to be aligned with seven colums of perforations on the drum 254, as shown in FIG. 7. Each row of perforations on the drum's periphery represents a position of the sheet positioning belt and the tabs thereon. As further shown in FIG. 7, the rows are numbered along the left margin in accordance with the number of positions of the belt, fifty such positions representing printing lines and the remaining ten positions representing those positions in which the stopping tabs are in the curved portions of their locus of travel and consequently are not in the guideway for stopping a document therein. The four columns of perforations of the drum identified with the notation "1–2–4–8" correspond to the "units" value of the line selecting belt while the three columns identified with the notation "1–2–4" correspond to the "tens" value thereof.

In the coded arrangement illustrated herein, the rows of holes on the drum exhibit a zig zag line pattern to conform with the staggered arrangement of the lamps 450 and the light beam directing holes. Therefore, starting from its numbered position in the leftmost column, each row of perforations on the drum assumes a zig zag pattern. This is indicated by the zig zag line A in FIGS. 6 and 7. Thus, in the example shown in FIG. 6, a segmental portion 470 of the drum 254 is shown which includes the perforation opposite to the numbers "17," "18" and "19" along the left margin of FIG. 7. In this example, the belt 68 has been positioned to present the 17th line of a document opposite to the platen 22 for printing thereon by the printer 20, FIG. 5. Thus the sheet positioning belt 68 has, through pulley 70, shaft 112, gears 262 and 258, rotated drum 254 by means of shaft 256 so that segment 470 of drum 254 is disposed between the lamps 452 and the photo-diodes 269. All of the lamps 452 are lighted but only the light from four of these lamps as indicated in heavy outline find registered holes in the drum for energizing the corresponding light sensitive elements 269 in fixture 268. In the example presented herein, the light from the lamps 450 scan the 17th line printing position represented by the zig zag line A and finds the four unblocked holes diagrammatically shown in FIG. 6. In other words, each line position represented by a row on the drum in FIG. 7 actually employs another row which is two rows therebeyond to signify its line position. To facilitate this understanding, the segmental portion 470 of the drum has been shown in dotted outline in FIG. 7. In the example provided for illustration, light beams are passed through registered holes along the 17th row in "units" code columns "1," "2" and "4" and also through one registered hole occurring in the "tens" code column "1." The signals derived from the light sensitive elements impinged by the light beams add to the sum seventeen, thus indicating the 17th printing line of the belt 68.

From the foregoing it will be appreciated that the zig zag or staggered relationship of the assembly of lamps 450 permits the size of the code drum to be reduced to a minimum. As a consequence the inertia of the thin shelled drum is correspondingly reduced to thus minimize its impact on the control mechanism 126 of the line selection mechanism during stopping operations thereof.

While there have been shown and described and pointed out the fundamental novel features of the invention as applied to a preferred embodiment, it will be understood that various omissions and substitutions and changes in the form and details of the device illustrated and its operation may be made by those skilled in the art without departing from the spirit of the invention. It is the intention, therefore, to be limited only as indicated by the scope of the following claims.

What is claimed is:

1. In apparatus for handling sequentially fed sheet items, sheet stop means, means for moving said stop means to one of a plurality of positions, means under control of electrical signals for arresting the movement of said sheet stop means at any preselected one of said positions, photo-optical means driven by said sheet stop means to indicate in which position the stop means is arrested, said photo-optical means including a hollow drum having code perforations therein and mounted for rotation relative to the movement of said stop means, light source means mounted external of said drum means, and photo-sensitive means housed within said drum means and responsive to said light source as altered by said code perforations.

2. In apparatus for handling sequentially fed sheet items comprising, in combination, an endless belt, tab means carried by said endless belt, means for moving said endless belt to impart movement to said tab means to cause the same to be interposed between successively fed sheet items, means under control of electrical signals for arresting the movement of the endless belt to position the tab means at a predetermined location, read-out means driven by said means for moving said endless belt, said read-out means including a hollow drum having binary decimal code perforations therein, housing means encircling said drum, photo-sensitive means supported by said housing means, and light source means supported externally of the outer periphery of said drum whereby rotation of said drum produces a light shutter effect and wherein each position of said tab corresponds to a unique presentation of holes opposite said photo-sensitive means.

3. Apparatus for handling sequentially fed sheet items comprising in combination, means defining a path through which the sheet items are fed, a sheet stopping abutment, drive means mounting said abutment for linear movement along said path, control means for stopping said abutment at a selected one of a plurality of positions located along said path, each located at decimal increments of displacement therealong, and corresponding to successive print receiving lines on the sheet items, photo-optical read-out means including a hollow drum having binary decimal code perforations therein, said perforations being indicative of the various positions of movement of the abutment, photo-sensitive means mounted within said drum means, and light source means mounted external of said drum so as to activate said photo-sensitive means in accordance with the pattern of binary decimal perforations presented as the abutment is moved in decimal increments through the various positions along said path.

4. Apparatus for handling sequentially fed sheet items comprising in combination, means defining a path through which the sheet items are fed, a sheet stopping abutment, drive means mounting said abutment for linear movement along said path, control means for stopping said abutment at a selected one of a plurality of positions, disposed at decimal increments along said path and corresponding to the spacing between successive print receiving lines on the sheet items, photo-optical read-out means including a hollow drum having binary decimal code perforations therein, said perforations disposed in rows and aligned in columns in said drum and wherein the perforations representative of a given position of the abutment along the path are contained on a pair of alternately spaced rows thereon, photo-sensitive means aligned in a pair of rows and radially disposed within said drum relative to an adjacent alternate pair of rows of perforations in the drum, and light source means mounted adjacent the periphery of the drum and in line with said photo-sensitive means whereby relative movement between said drum and said photo-sensitive elements and said light source activate said photo-sensitive elements in accordance with the perforations passed therebetween.

5. In apparatus for arresting a moving sheet item and for indicating the position in which the item is arrested comprising, means for sequentially feeding sheet items along a path, sheet abutment means movable in blocking relation relative to the movement of said sheet item along said path, means for moving said sheet abutment means along said path, means for selectively arresting the movement of said sheet abutment means at one of a plurality of positions along said path, hollow drum means connected to said abutment moving means, said drum including binary coded decimal perforations therein commensurate with each of said plurality of positions, light source means mounted externally of said drum, photo-sensitive means mounted within said drum means and in line with said light source means, whereby upon arresting the movement of said abutment means at a selected position will correspondingly arrest the movement of the drum so that a unique pattern of perforations is interposed between said light source and said photo-cells to cause the latter to emit electrical signals corresponding thereto.

6. In read-out apparatus for indicating the mechanical positioning of sheet abutment means which limit the travel of sheet items relative to a printing device comprising, sheet abutment means movable along a predetermined path, means for moving said abutment means along said path, means for selectively arresting said abutment means at one of a plurality of positions along said path, hollow drum means having binary coded decimal perforations therein mounted for concurrent movement with said abutment means, stationary means enclosing said drum means, light source means mounted externally of said stationary means, and photo-sensitive means mounted within said drum and supported upon said stationary means, whereby said photo-sensitive means are responsive to generate electrical signals indicative of each of said positions of said abutment means along said path.

7. In printing apparatus for permutably arresting sequentially fed sheet items at a selected one of a plurality of positions along their path of movement to thereby position the same for receiving printing impressions from a printer on a selected line thereof, comprising in combination, sheet stop means movable into and along the path of movement of the sheet items, drive means for moving said stop means, means for arresting said drive means to stop said stop means in said path, hollow drum means having binary decimal coded perforations therein driven by said rotatable means, light source means mounted externally of said drum, and light responsive means housed within said drum and adapted to generate electrical signals indicative of the arrested position of said obstructing means.

8. In a photo-optical read-out device for converting information of one form into another form comprising, a hollow drum having a coded pattern of perforations therein, said perforations being aligned in rows and disposed in columns about the periphery of the drum, means for rotating said drum extending from one end thereof, shroud means enclosing said drum, lamp means mounted externally of said shroud means and aligned with said columns of perforations, said shroud means including perforations for permitting light to pass from said lamp means to said drum means, a plurality of photo-cell means extending within said drum means and aligned with said lamp means and said columns of perforations, and mounting means for supporting said photocells to a portion of said shroud means.

9. In a photo-optical read-out device for converting information of one form into another form comprising, a hollow drum having a coded pattern of perforations therein, said perforations being aligned in rows and disposed in columns about the periphery of the drum, means for rotating said drum extending from one end thereof, shroud means enclosing said drum to provide a light tight seal therefor, lamp means mounted externally of said shroud means and aligned with said columns of perforations, said lamp means further being disposed in two rows which correspond in spacing between rows with the distance between a pair of alternate rows of perforations in said drum, said shroud means including apertures for permitting light to pass therethrough from said lamp means.

10. In apparatus for handling sheet items comprising, in combination, means defining a guideway, means for sequentially feeding sheet items along said guideway, sheet stop means, means for moving said sheet stop means relative to an adjacent pair of said sequentially fed items and into said guideway so that the sheet stop means is interposed between the trailing edge of the first sheet of the pair and the leading edge of the second sheet of the pair, means under control of electrical signals for arresting the movement of the sheet stop means at a predetermined location along said guideway thereby to stop the movement of said second sheet, and means for recording the position of said sheet in said guideway whereby said apparatus is enabled to stop said sheet upon its being again fed into said guideway.

11. In apparatus for handling sheet items comprising, in combination, means defining a guideway, means for sequentially feeding sheet items along said guideway, sheet stop means, means for moving said sheet stop means relative to an adjacent pair of said sequentially fed items and into said guideway so that the sheet stop means is interposed between the trailing edge of the first sheet of the pair and the leading edge of the second sheet of the pair, means under control of electrical signals for arresting the movement of the sheet stop means at a predetermined location along said guideway thereby to stop the movement of said second sheet, means for incrementally moving said sheet stop means to step said sheet through said guideway to different positions, and means for recording the last position of said sheet in said guideway whereby said apparatus is enabled to stop said sheet at said last position upon its being again fed into said guideway.

References Cited in the file of this patent

UNITED STATES PATENTS

| | | |
|---|---|---|
| 1,960,560 | Todd et al. | May 29, 1934 |
| 2,784,967 | Woodhead | Mar. 12, 1957 |